Patented Nov. 10, 1942

2,301,260

UNITED STATES PATENT OFFICE 2,301,260

MEDICINAL COMPOUNDS

John Stanley Herbert Davies and Leslie Alderman Elson, Blackley, Manchester, England, assignors to Imperial Chemical Industries Limited, a corporation of Great Britain No Drawing. Application December 29, 1941, Serial No. 424,840. In Great Britain January 4, 1941

8 Claims. (Cl. 260—613)

This invention relates to the manufacture of new chemical compounds useful as medicinals, and particularly as oestrogenic agents.

It is an object of this invention to provide new chemical compounds which are useful as oestrogenic agents. A further object is to provide processes for the manufacture of the said compounds.

These objects are achieved by the present invention whereby there are provided new chemical compounds, namely the tri-p-anisyl-alkylethylenes of the formula

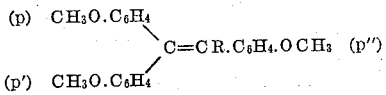

wherein R stands for a radical selected from the group consisting of methyl and ethyl.

The said new compounds can be made by causing α-methyl- or α-ethyl-deoxyanisoin to undergo a Grignard reaction with anisyl magnesium bromide or iodide, hydrolysing the product so formed to the carbinol of formula

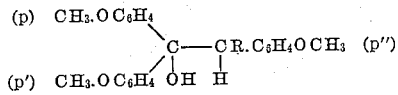

R as before being methyl or ethyl, and then dehydrating the latter by known means for example by heating in vacuo or in presence of sulphuric or phosphoric acid or acetyl chloride or acetic anhydride.

This series of reactions can be represented as follows, R being methyl or ethyl and X being Br or I.

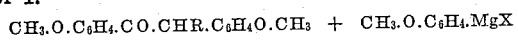

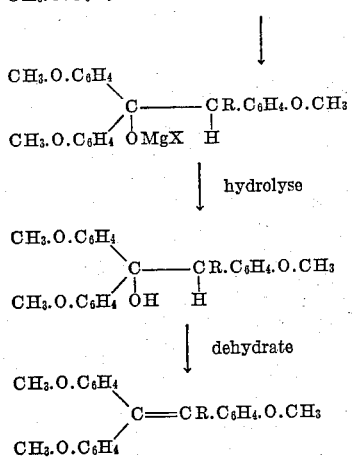

The Grignard reaction is well known. It involves forming an organomagnesium compound by interaction of magnesium with an alkyl or aryl halide in dry ether and then bringing this into reaction with an aldehyde, a ketone or a carboxylic acid or derivative thereof. It was described by Grignard in Comptes rendues, volume 130, page 1322, and has become a very widely used synthetic process—see, for example, Runge, "Organometallverbindungen," Part I, Organomagnesiumverbindungen, Stuttgart 1932.

The α-alkyl-deoxyanisoins used as starting materials may conveniently be made by the method described by Dodds and others in the Proceedings of the Royal Society, part B, 1939, vol. 27, pp. 148 and 156.

The following examples illustrate, but do not limit, the invention. The parts are by weight.

Example 1

A Grignard reagent is prepared by adding 18.5 parts of p-bromoanisole to 2.45 parts of magnesium suspended in 100 parts of dry ether. To this there are then gradually added 27 parts of α-methyl-deoxyanisoin. When all has been added, the mixture is boiled under reflux for 2 hours, cooled and then added, with stirring, to a solution of 200 parts of ammonium chloride in 1000 parts of water. Stirring is continued for ½ hour. The ether layer is then separated off, the aqueous layer extracted with a further quantity of ether and the two ether solutions combined and dried over calcium chloride. The ether is then distilled off. The crude oily carbinol so-obtained is then boiled for 3 hours with three times its volume of acetyl chloride. The mixture is then poured on to ice. The tri-p-anisyl-methylethylene, which at first separates out as an oil, solidifies on standing. It is then purified by crystallisation from methanol, whereby it is obtained in the form of colourless crystals of M. P. 118° C.

Example 2

A Grignard reagent is prepared by adding a solution of 30 parts of p-bromoanisole in 40 parts of dry ether to 3.9 parts of magnesium suspended in 60 parts of dry ether. To this solution there is gradually added, with stirring, a solution of 22.5 parts of α-ethyl-deoxyanisoin in 70 parts of dry ether. When all has been added the mixture is allowed to stand for one hour, boiled under reflux for 3 hours and then allowed to stand for 18 hours. It is then added to a stirred ice-cold solution of 200 parts of ammonium chloride in 1000 parts of water. The ether layer is separated off, the aqueous layer extracted with a further quantity of ether and the two ether solutions combined and dried over anhydrous sodium sulphate. The ether is then distilled off. The residue is a gum. This is heated for ½ hour at 200° C. under a pressure of 20 mm. of mercury and is then distilled under high vacuum. The tri-p-anisylethylethylene distils over at 218–220° C. at 0.3 mm. It is then purified by crystallisation from methanol whereby it is obtained in the form of colourless needles of M. P. 90–92° C.

While the above examples illustrate specific embodiments of the invention, it will be apparent to one skilled in the art that many other modifications can be made without departing from the spirit and scope thereof, and accordingly it is to be understood that the invention is not limited to the particular embodiments above described, but only as defined in the following claims.

We claim:

1. Tri-p-anisyl-alkyl-ethylenes of the formula

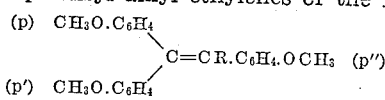

wherein R stands for a radical selected from the group consisting of methyl and ethyl.

2. Tri-p-anisyl-methyl-ethylene.

3. Tri-p-anisyl-ethyl-ethylene.

4. Process for the manufacture of tri-p-anisyl-alkyl-ethylenes of the formula

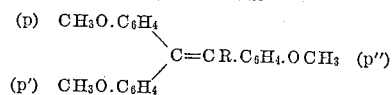

which comprises causing a compound of the formula

to interact with a compound of the formula $CH_3O.C_6H_4.MgX$, R in the formulae representing a radical selected from the group consisting of methyl and ethyl, and X an atom selected from the group consisting of Br and I, hydrolysing the product so formed to the carbinol of formula

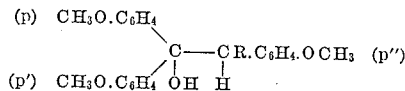

R having the same meaning as before, and dehydrating the latter.

5. Process which comprises interacting α-methyl-deoxy-anisoin with anisyl magnesium bromide, hydrolysing the product with aqueous ammonium chloride to form 1:1′:2-tri-p-anisyl-propanol-1 and dehydrating the latter to form tri-p-anisyl-methyl-ethylene.

6. Process which comprises interacting α-ethyl-deoxy-anisoin with anisyl magnesium bromide, hydrolysing the product with aqueous ammonium chloride to form 1:1′:2-tri-p-anisyl-butanol-1 and dehydrating the latter to form tri-p-anisyl-ethyl-ethylene.

7. The processes which comprise interacting alpha-methyl-deoxyanisoin with anisyl magnesium iodide, hydrolizing the product obtained to form 1:1′:2-tri-p-anisyl-propanol-1 and dehydrating the latter to form tri-p-anisyl-methyl-ethylene.

8. The processes which comprise interacting alpha-methyl-deoxyanisoin with anisyl magnesium iodide, hydrolizing the product with aqueous ammonium chloride to form 1:1′:2-tri-p-anisyl-propanol-1 and dehydrating the latter to form tri-p-anisyl-methyl-ethylene.

JOHN STANLEY HERBERT DAVIES.
LESLIE ALDERMAN ELSON.